United States Patent
Fujino et al.

(10) Patent No.: US 7,546,008 B2
(45) Date of Patent: Jun. 9, 2009

(54) VARIABLE OPTICAL ATTENUATOR AND RANGING APPARATUS USING THE SAME

(75) Inventors: Makoto Fujino, Tokyo (JP); Hiroyuki Kawashima, Tokyo (JP)

(73) Assignee: Kabushiki Kaisha TOPCON, Tokyo (JP)

( * ) Notice: Subject to any disclaimer, the term of this patent is extended or adjusted under 35 U.S.C. 154(b) by 0 days.

(21) Appl. No.: 11/890,559

(22) Filed: Aug. 7, 2007

(65) Prior Publication Data

US 2008/0044152 A1 Feb. 21, 2008

(30) Foreign Application Priority Data

Aug. 8, 2006 (JP) ............................. 2006-215526
Oct. 30, 2006 (JP) ............................. 2006-294219

(51) Int. Cl.
*G02B 6/26* (2006.01)
*G02B 6/00* (2006.01)
*G01C 3/00* (2006.01)
*C01C 3/08* (2006.01)

(52) U.S. Cl. ........................ 385/31; 385/140; 385/13; 356/3; 356/5.1

(58) Field of Classification Search ............... 385/140, 385/31, 13, 33; 356/5, 5.1
See application file for complete search history.

(56) References Cited

U.S. PATENT DOCUMENTS

| | | | |
|---|---|---|---|
| 6,137,941 A | 10/2000 | Robinson | |
| 6,243,507 B1 * | 6/2001 | Goldstein et al. | ............. 385/13 |
| 6,292,616 B1 * | 9/2001 | Tei et al. | ...................... 385/140 |
| 6,356,344 B1 * | 3/2002 | Ohishi et al. | .................. 356/5.1 |
| 6,614,958 B1 * | 9/2003 | Schmidt | ....................... 385/33 |
| 6,636,682 B2 * | 10/2003 | Wang et al. | .................. 385/140 |
| 2003/0026582 A1 * | 2/2003 | In'T Hout et al. | ............ 385/140 |

FOREIGN PATENT DOCUMENTS

| | | |
|---|---|---|
| EP | 1 219 973 A2 | 7/2002 |
| JP | 2000-162517 | 6/2000 |
| JP | 2004-347663 | 12/2004 |

OTHER PUBLICATIONS

European Patent Office, European Search Report for European Patent Application No. EP 07 01 5465, Dec. 13, 2007, European Patent Office, Munich, Germany.

* cited by examiner

*Primary Examiner*—Frank G Font
*Assistant Examiner*—Robert Tavlykaev
(74) *Attorney, Agent, or Firm*—Chapman and Cutler LLP (57) ABSTRACT

A variable optical attenuator for adjusting a power of light which is output from an output end of a first optical fiber and is to be led to an input end of a second optical fiber, includes a reflection member which reflects the light output from the output end of the first optical fiber, a density filter which transmits the light reflected from the reflection member and controls the power of the light which is transmitted by the density filter depending on a light-transmitting position on the density filter, and an optical member which reflects the light transmitted by the density filter to lead the light to the reflection member. The reflection member is disposed tiltably, the power of the light transmitted by the density filter attenuates along a direction in which the light-transmitting position is changed, and the light-transmitting position of the light is changed by tilting the reflection member.

13 Claims, 8 Drawing Sheets

VARIABLE OPTICAL ATTENUATOR AND RANGING APPARATUS USING THE SAME

CROSS-REFERENCE TO RELATED APPLICATIONS

This application is based on and claims priority from Japanese Patent Application Nos. 2006-215526, filed on Aug. 8, 2006, and 2006-294219, filed on Oct. 30, 2006, the disclosure of which is incorporated herein by reference in its entirety.

BACKGROUND OF THE INVENTION

1. Field of the Invention

The present invention relates to a variable optical attenuator and a ranging apparatus using the variable optical attenuator.

2. Description of the Related Art

A ranging apparatus for measuring a distance by irradiating light to a subject and receiving the light reflected from the subject has been known (Japanese Patent Laid-Open Publication Number 2001-162517).

The ranging apparatus has a variable optical attenuator having a density filter which adjusts a light power of an internal reference-light path and an external measurement-light path. The density filter has a density gradient in a rotational direction, and a density, that is to say, a light power is switched depending on the density gradient by rotating the density filter at a desirable angle by a motor so that a desirable light power can be output.

However, since the above-mentioned density filter having the density gradient is required to have a large size and to be rotated by the motor, there is a problem in that it is difficult to rapidly switch the density.

SUMMARY OF THE INVENTION

An object of the present invention is to provide a variable optical attenuator for switching rapidly artical power attenuation and a ranging apparatus using the variable optical attenuator.

To achieve the above object, a variable optical attenuator according to an embodiment of the present invention adjusts a power of light which is output from an output end of a first optical fiber and is to be led to an input end of a second optical fiber. The variable optical attenuator includes a reflection member which reflects the light output from the output end of the first optical fiber, a density filter which transmits the light reflected from the reflection member and controls the power of the light which is transmitted by the density filter depending on a light-transmitting position on the density filter, and an optical member which reflects the light transmitted by the density filter to lead the light to the reflection member. The reflection member is disposed tiltably. The power of the light transmitted by the density filter attenuates along a direction in which the light-transmitting position is changed. The light-transmitting position is changed by tilting the reflection member.

DETAILED DESCRIPTION OF THE PREFERRED EMBODIMENTS

Preferred embodiments of a variable optical attenuator and a ranging apparatus using the variable optical attenuator according to the present invention will be explained in detail with reference to the accompanying drawings below.

EXAMPLE 1

Figure 1:
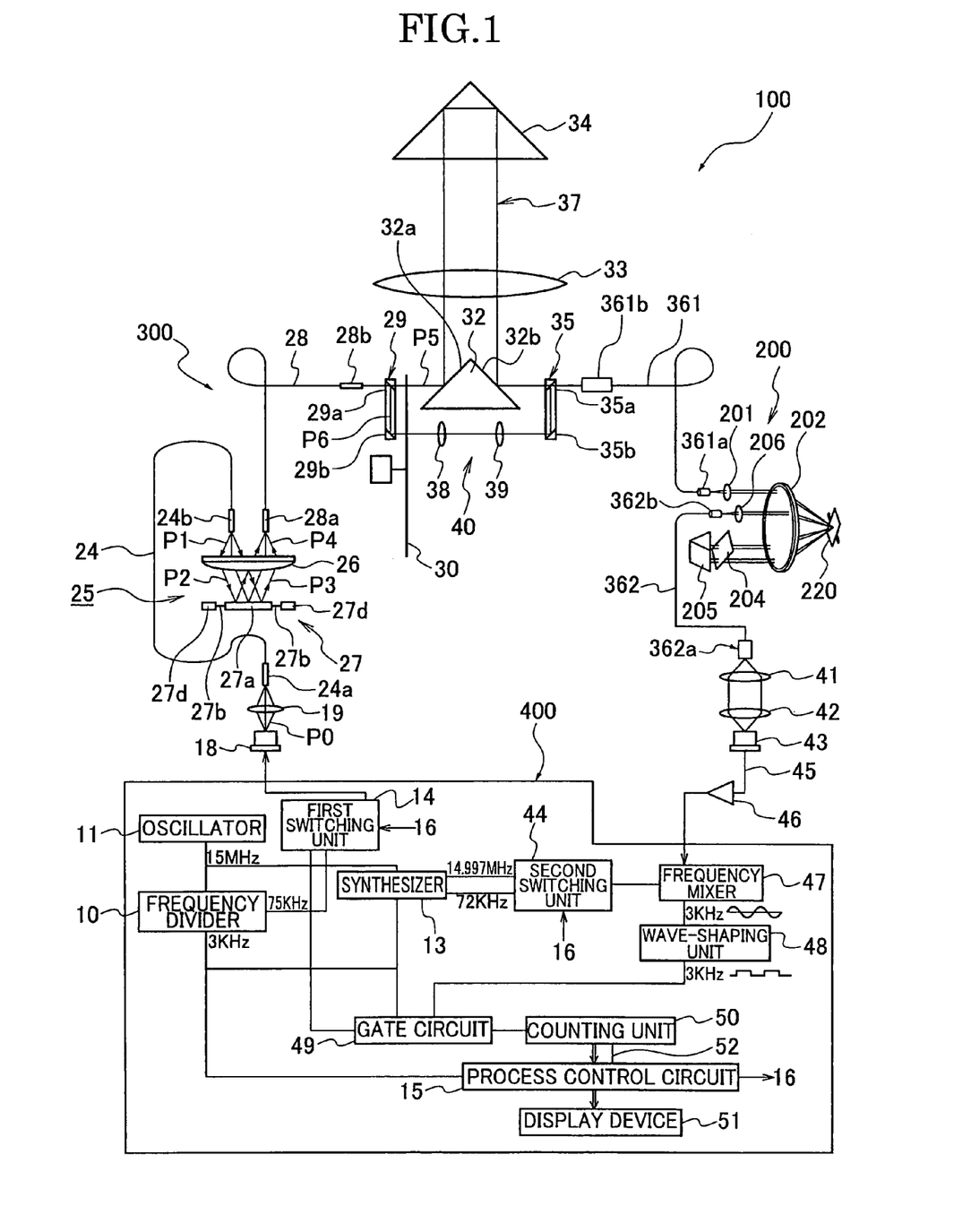
FIG. 1 is an explanatory view showing a first embodiment of a ranging apparatus using a variable optical attenuator according to the present invention.

FIG. 1 shows a first example of a ranging apparatus 100 using a variable optical attenuator 200 according to the present invention. The ranging apparatus 100 has a semiconductor laser 18 as a light source which is controlled by a control device 400. A subject is irradiated with laser light emitted from the semiconductor laser 18 via a mixing device 300, and the light reflected from the subject is detected by a light-receiving portion, for example, a light-receiving element 43 to measure a distance to the subject.

The mixing device 300 includes a light-guiding optical fiber 24, a collimating lens 26, a reflection oscillating device 25, and a light-mixing optical fiber. The optical fibers 24, 28 have input ends 24a, 28a and output ends 24b, 28b, respectively. A diameter of the optical fiber 28 is, for example, 300 μm.

The semiconductor laser 18 is driven by an output signal from a first switching portion 14 (mentioned below) of the control device 400 to emit laser light P0 modulated by the control device 400. The emitted laser light P0 is input to the input end 24a of the optical fiber 24 via a lens 19.

The reflection oscillating device 25 is provided in a light path between the optical fibers 24 and 28. The reflection oscillating device 25 has a Micro Electro Mechanical Systems (MEMS) 27.

The term MEMS is used as the generic name for a micro device combining mechanical elements with electrical elements. The MEMS is a technique having a new function brought about by including at least one movable portion on a chip or a substrate, and the technique is not seen in conventional techniques of semiconductor devices. It has been expected that the function can be applied to input/output portions or various sensors as a new platform technology.

Figure 2:
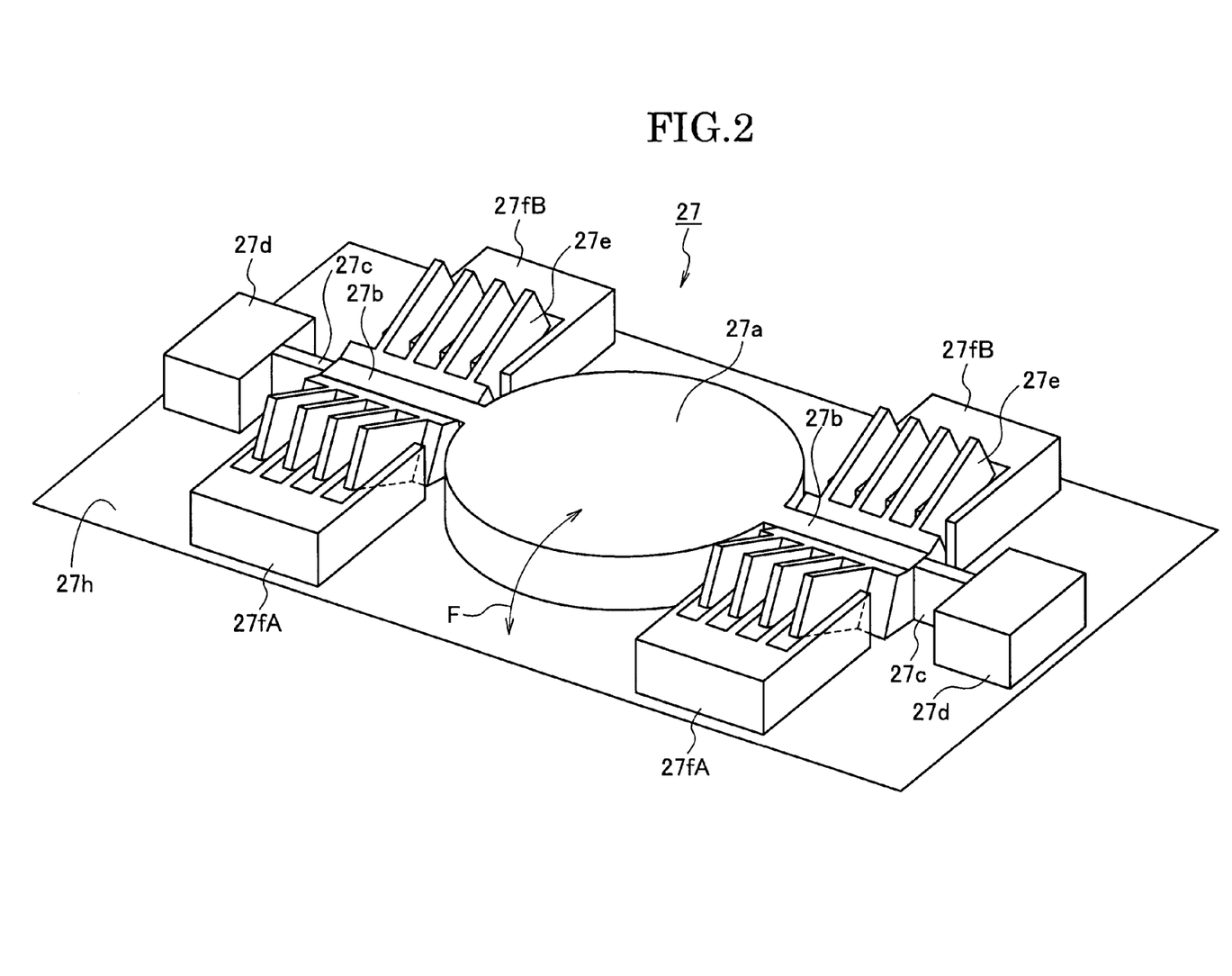
FIG. 2 is a perspective view showing a general structure of a MEMS of a reflection-oscillating device shown in FIG. 1.

FIG. 2 shows a schematic structure of the MEMS 27 of the reflection oscillating device 25. The reflection oscillating device 25 has a disk-shaped mirror 27a and includes an actuator. The actuator drives the mirror 27a. The mirror 27a has a diameter of, for example, about 1 mm. The mirror 27a has a circumference provided with a pair of shanks 27b, 27b extending along one diametrical direction of the mirror 27a.

Each of the shanks 27b, 27b has an end connected to a fixing portion 27d via a spring portion 27c. Movable comb portions 27e, 27e are provided movably along the shanks 27b, 27b, respectively. The movable comb portions are inserted in comb-fixing portions 27fA and 27fB. The movable comb portion 27e and the comb-fixing portion 27fA, 27fB form a part of the actuator. The fixing portion 27d and the comb-fixing portions 27fA, 27fB are, for example, fixed on a substrate 27h.

The mirror 27a is oscillated in a direction shown by an arrow F around the shanks 27b, 27b, as shown in FIG. 1, by applying an alternating-current voltage to the comb-fixing portions 27fA and 27fB, connecting the movable comb portions 27e, 27e to a ground (GND) and charging them with a high frequency, for example, 1 kHz. Although it is illustrated that the mirror 27a is oscillated in a uniaxial direction, the mirror 27a may be oscillated in biaxial directions by providing another pair of shanks in a direction perpendicular to the extending direction of the shanks 27b, 27b.

Moreover, an identical signal may be applied to the above-mentioned comb-fixing portions 27fA, 27fB. However, two individual signals having individual waveforms may be applied to one and another of the comb-fixing portions 27fA, 27fB. By way of example of the individual waveforms, a sine wave is applied to the comb-fixing portion 27fA, a cosine wave is applied to the comb-fixing portion 27fB and the fixing portion 27d is connected to the GND, or a sine wave is applied to the comb-fixing portion 27fB and the comb-fixing portion 27fA and the fixing portion 27d are connected to the GND.

Figure 3:
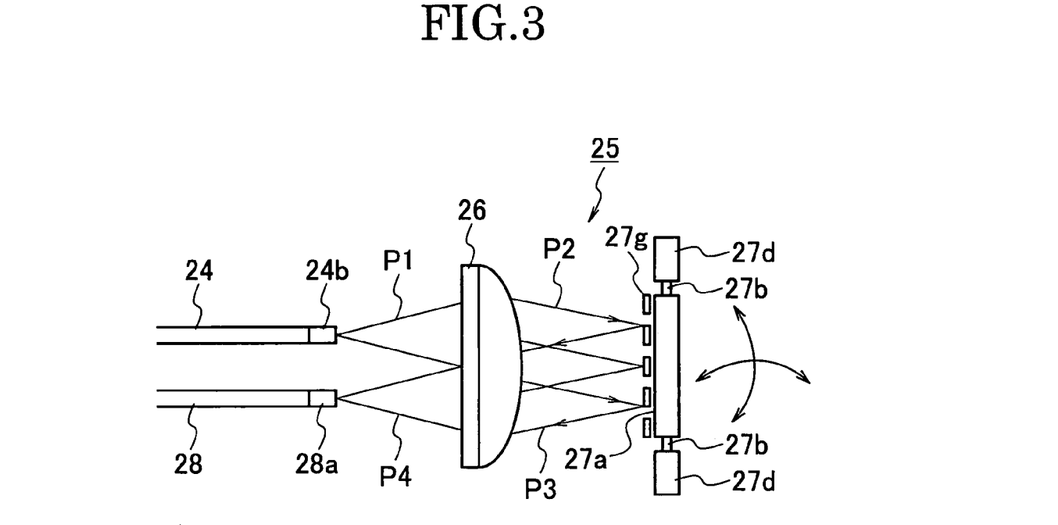
FIG. 3 is an explanatory view showing operations of the reflection-oscillating device shown in FIG. 2.

Operations of the reflection oscillating device 25 will be explained with reference to FIG. 3. A grating portion 27g is formed on a front surface of the mirror 27a as schematically shown in FIG. 3. The grating portion 27g moves in cooperation with the mirror 27a such that intensity of the laser light is homogenized to allow an unevenness of the intensity of the laser light to be eliminated. Therefore, the grating portion 27g can enhance a mixing effect of the reflection oscillating device 25.

As shown in FIG. 3, a laser light P1 which is led to the first optical fiber 24 and is output from the output end 24b is converted into a parallel light P2 by the collimating lens 26 and is led to the grating portion 27g and the mirror 27a. The grating portion may be a grating plate 27g. The parallel light P2 is diffracted by the grating plate 27g and reflected from the mirror 27a.

Figure 4:
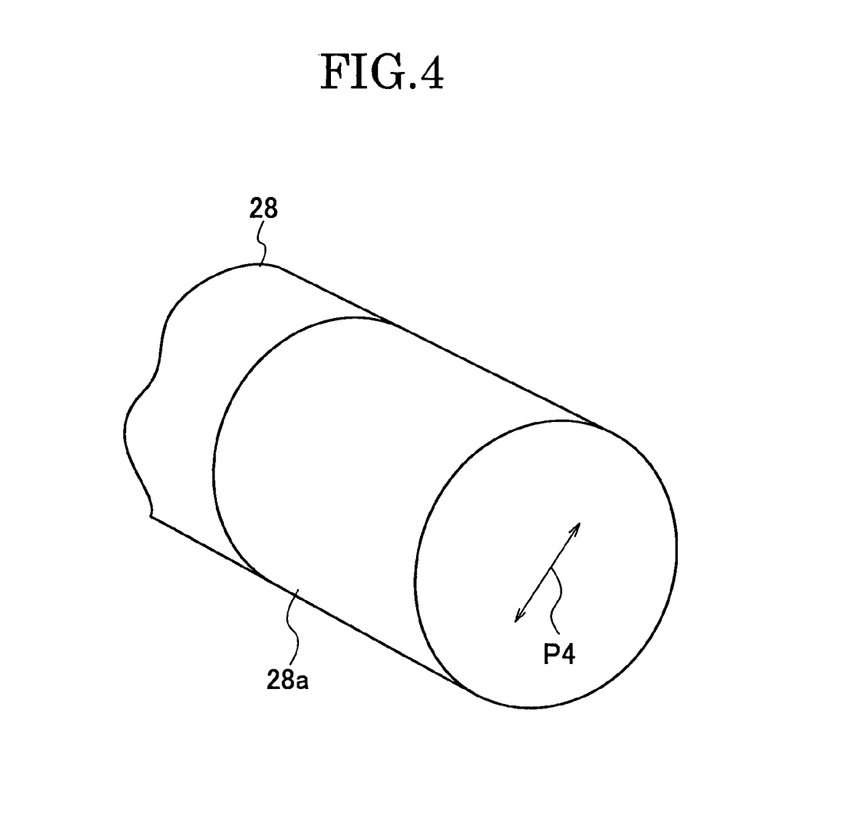
FIG. 4 is an explanatory view showing a state where a laser beam incident to a second optical fiber oscillates.

Reflected light P3 is focused by the collimating lens 26 and is input to the input end 28a of the optical fiber 28 as convergent light P4. Since the mirror 27a is oscillated around the pair of shanks 27b, 27b, an inputted position of the convergent light P4 is oscillated in a coverage of the input light when the convergent light P4 is input to the input end 28a as schematically shown in FIG. 4. Since the convergent light P4 is moved such that the laser light P0 is oscillated to vary a light path, the intensity of the laser light P0 is homogenized to allow the uneven intensity of the laser light P0 to be eliminated.

With reference to FIG. 4, the oscillation of the laser light when the light is input to the second optical fiber shown in FIG. 3 is illustrated. A trajectory of the light P4, by way of example, in a linear and periodic form is shown. The trajectory of the light P4 may be in a non-linear form, for example, in a radial form or in a Lissajous figure form.

Light which is output from the output end 28b of the optical fiber 28 is split into two light paths by a light splitting prism 29 as shown in FIG. 1. Light P5 directed to one light path of the two light paths passes through a splitting portion 29a of the light splitting prism 29 and a light-path selecting device, for example, a chopper 30. The light P5 is reflected on a reflecting surface 32a of a prism 32 which forms a part of an irradiation part of the ranging apparatus, and is converted into parallel light as measurement light by an objective lens 33. The measurement light is output to an exterior of the ranging apparatus.

The measurement light is reflected from a subject, such as a corner cube 34 which is placed at a point to be measured, and passes again through the objective lens 33. The measurement light is then reflected on a reflecting surface 32b of the prism 32, passes through a splitting portion 35a of a light splitting prism 35, and is input to a light-receiving optical fiber 361. As mentioned above, the light path from the splitting portion 29a of the light splitting prism 29 to the splitting portion 35a of the light splitting prism 35 via the prism 32 and the corner cube 34 is configured to be an external measurement-light path 37 for measuring a distance to the subject.

Light P6 directed to the other light path of the two light paths split by the light splitting prism 29 is reflected on the splitting portion 29a and a splitting portion 29b and passes through the chopper 30. The light P6 is then converted into a parallel light by a lens 38, is condensed by a lens 39, is reflected on the splitting portion 35b and a splitting portion 35a of the light splitting prism 35, and is input to the optical fiber 361. As mentioned above, the light path from the splitting portion 29a of the light splitting prism 29 to the splitting portion 35a of the light splitting prism 35 via the splitting portion 29b of the light splitting prism 29, the lenses 38, 39, and the splitting portion 35b of the light splitting prism 35 is configured to be an internal reference-light path 40.

The variable optical attenuator 200 is provided, for example, on a receiving side of the measurement light, that is to say, between the optical fiber 361 and an optical fiber 362.

The chopper 30 selects alternately the internal reference-light path 40 and the external measurement-light path 37. The variable optical attenuator 200 adjusts a power of each lights passing the internal reference-light path 40 and the external measurement-light path 37.

Figure 5:
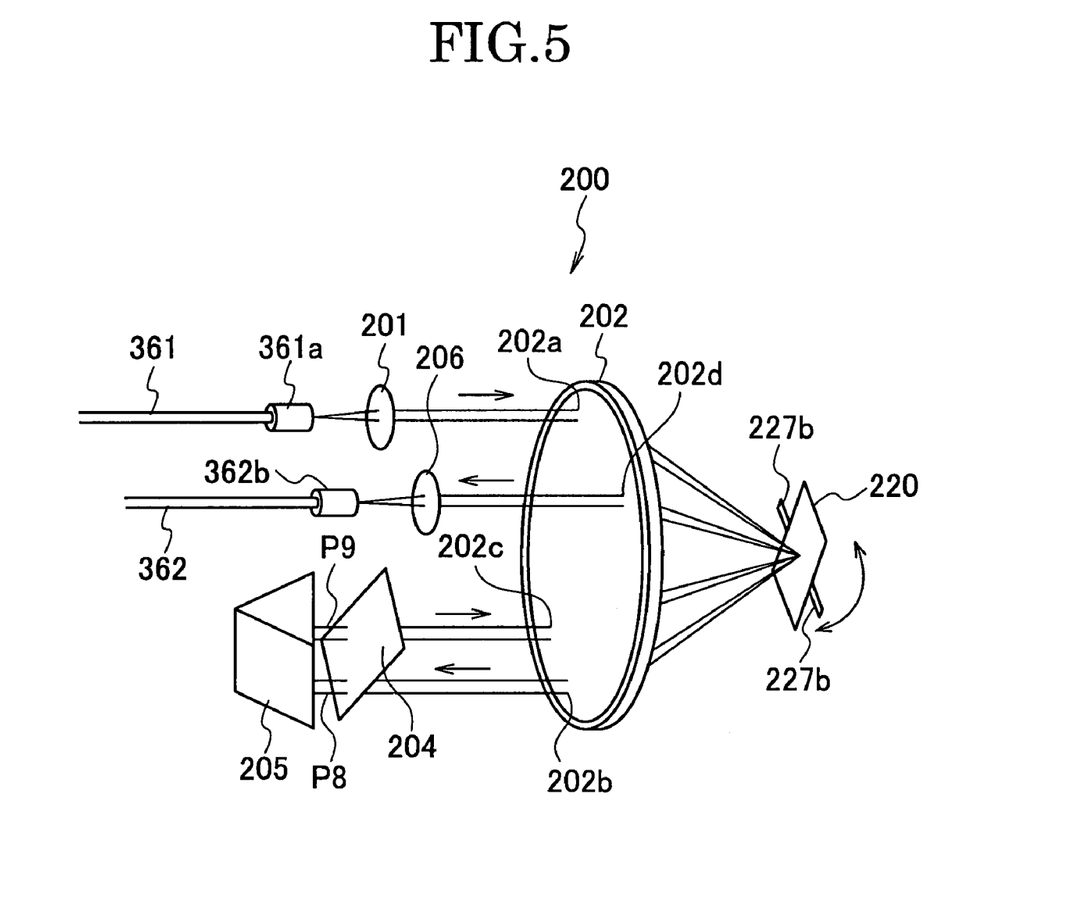
FIG. 5 is a view showing an optical layout of the variable optical attenuator.

The variable optical attenuator 200 is illustrated with reference to FIG. 5. The variable optical attenuator 200 has a reflection member, for example, a flat mirror 220 which reflects laser light output from an output end 361a of the optical fiber 361, and a density filter 204 which transmits the light reflected from the flat mirror 220 and controls a power of the light depending on a light-transmitting position on the density filter. The density filter can change the light-transmitting position by tilting the flat mirror 220. As shown in FIG. 5, the variable optical attenuator 200 further includes a collimating lens 201 which converts the laser light output from the output end 361a of the optical fiber 361 into parallel light, a condenser lens 202 which condenses the parallel light, an optical member, for example, a rectangular prism 205 having reflecting surfaces disposed perpendicularly to each other, and which moves light P8 transmitted by the density filter 204 in parallel and reflects the light P8 toward the condenser lens 202, and a condenser lens 206 which inputs the light to an input end 362b of the optical fiber 362. The flat mirror 220 reflects the light condensed by the condenser lens 202 toward the condenser lens 202. The density filter transmits the light reflected on the flat mirror 220 and collimated by the condenser lens 202. The flat mirror is disposed on a focus position of the condenser lens 202.

Although the rectangular prism 205 is used as the optical member, the optical member may include, for example, flat mirrors disposed in parallel to each other.

Passing points 202a to 202d of the laser light on the condenser lens 202 are disposed as shown in FIG. 5, that is to say, the output end 361a of the optical fiber 361, the collimating lens 201, the condenser lens 202, the flat mirror 220, the density filter 204, the rectangular prism 205, the condenser lens 206, and the input end 362b of the optical fiber 362 are disposed such that a line connecting the passing point 202a with the passing point 202d and a line connecting the passing point 202b with the passing point 202c are to be in parallel to a shank 227b.

A first optical device is provided with the collimating lens 201, the condenser lens 202, and the flat mirror 220.

Light P9 reflected on the rectangular prism 205 transmits again through the density filter 204 and is condensed by the condenser lens 202. The light P9 is then reflected on the flat mirror 220 toward the condenser lens 202, is converted into parallel light by the condenser lens 202, is condensed by the condenser lens 206 and is input to the input end 362b of the optical fiber 362.

A second optical device is provided with the rectangular prism 205, the condenser lens 202, the flat mirror 220, and the condenser lens 206.

The density filter 204 is configured to have a density gradient in upward and downward directions to allow a power of the light transmitted by the density filter 204 to be attenuated depending on the density gradient. That is to say, for example, as the light-transmitting position moves upwardly, the power of the transmitting light increases.

Figure 6:
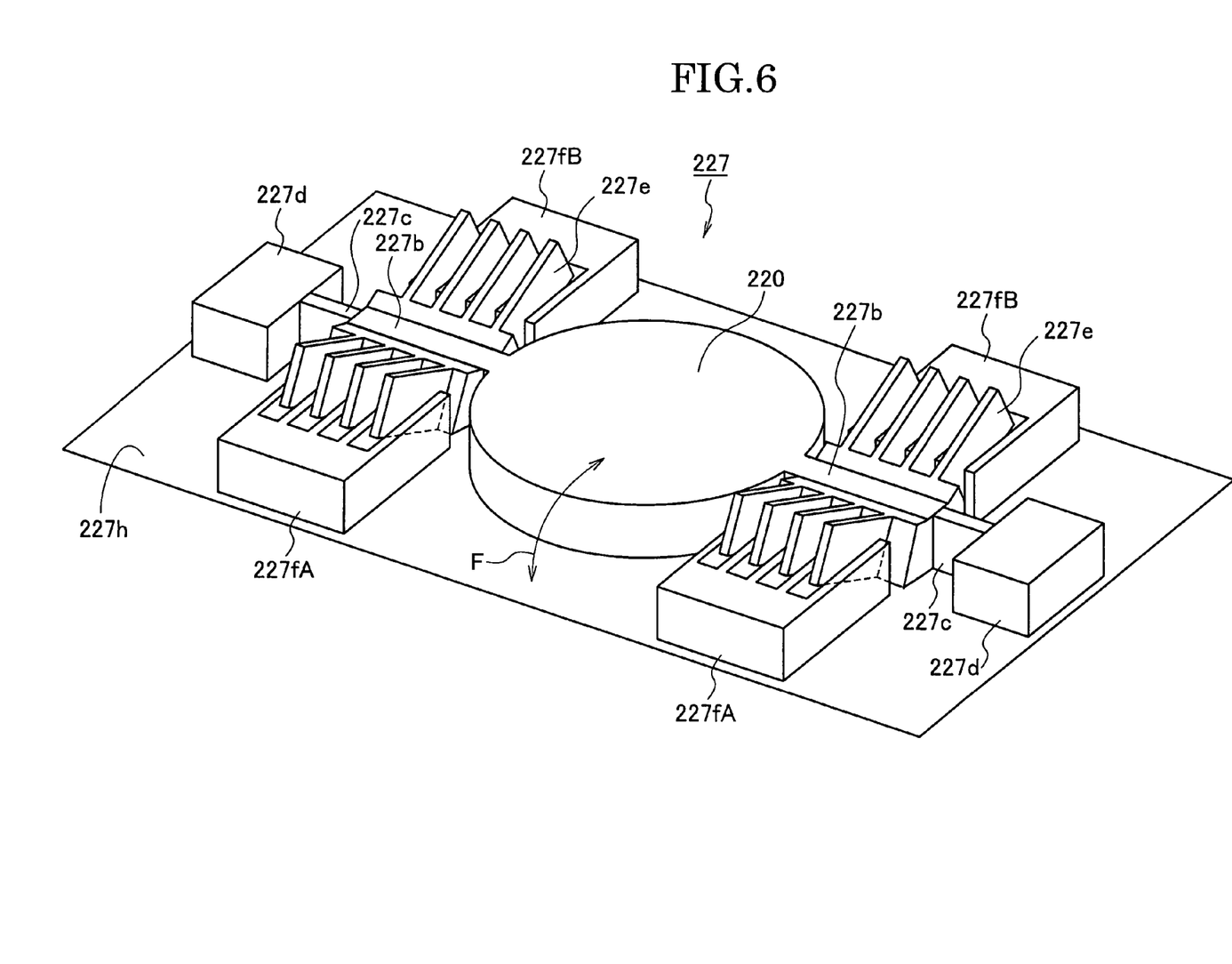
FIG. 6 is a perspective view showing a structure of the MEMS of the reflection-oscillating device.

The flat mirror 220 is, for example, a mirror of a reflection oscillating device 227 shown in FIG. 6. A detailed explanation about the reflection oscillating device 227 is omitted because the reflection oscillating device 227 has the same structure as that of the MEMS 27 of the reflection oscillating device 25.

Figure 7:
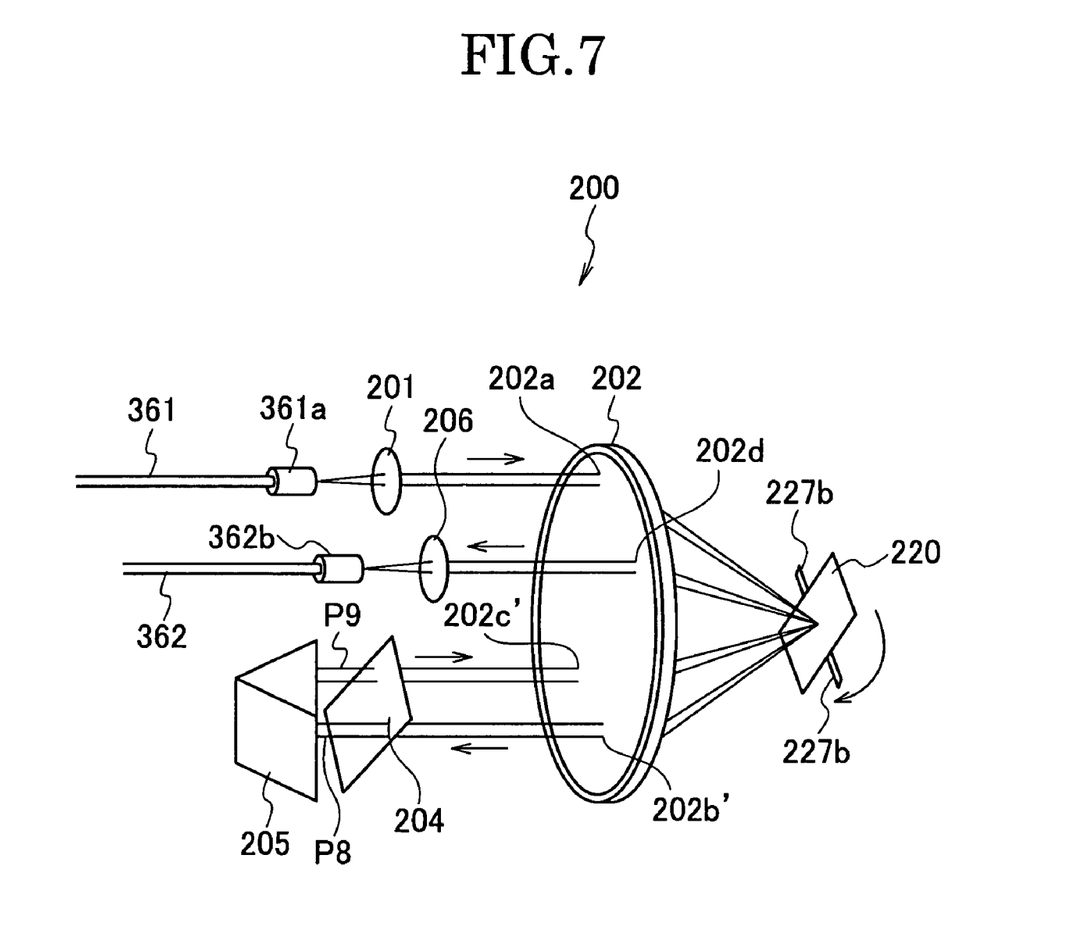
FIG. 7 is an explanatory view showing a switching of a power of laser light by tilting movement of a flat mirror.
Figure 9:
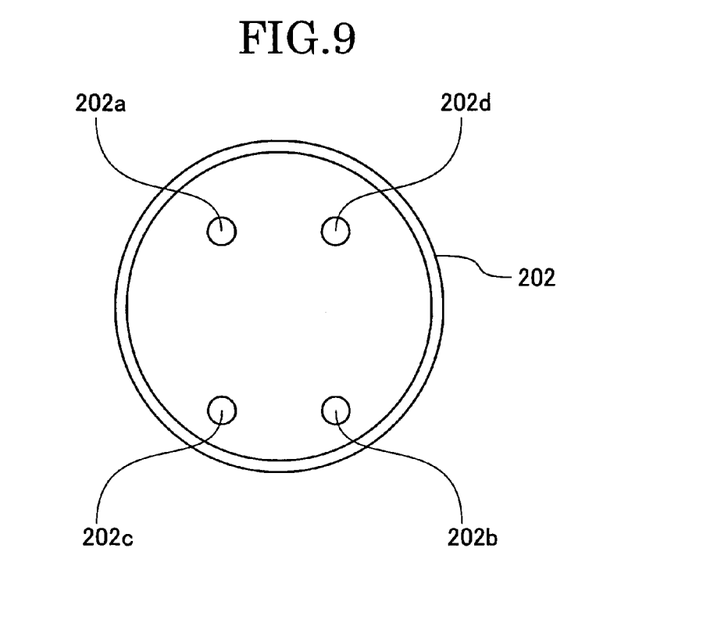
FIG. 9 is an explanatory view showing a light-transmitting position of the laser light in a condenser lens.
Figure 10:
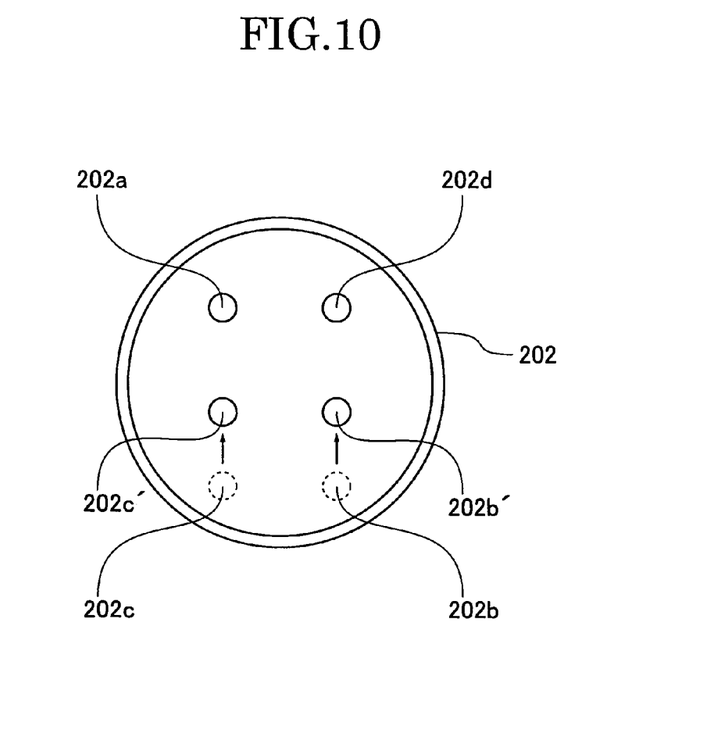
FIG. 10 is an explanatory view showing a case in which a light-transmitting position of the laser light in the condenser lens is moved upwardly.

The flat mirror 220 tilts around a pair of shanks 227b, 227b, that is to say, the flat mirror 220 tilts back and forth in relation to the shanks 227b, 227b in FIG. 5. A light-transmitting position of the light P8 transmitted by the density filter 204 moves in upward and downward directions on the density filter due to tilting of the flat mirror 220. For example, if the flat mirror 220 turns around the pair of shanks 227b, 227b in a clockwise direction, the light-transmitting position of the light P8 moves upwardly on the density filter 204 as shown in FIG. 7, and the passing positions 202b and 202c on the condenser lens 202 shown in FIGS. 5 and 9 move to passing positions 202b' and 202c' shown in FIGS. 7 and 10.

That is to say, the light P8 and P9 moves by tilting of the flat mirror 220 in a direction perpendicular to the direction of a parallel movement of the light P8 to the light P9 by the rectangular prism 205.

Due to the movement of the lights P8, P9 and the density gradient of the density filter 204, the power of the light can be adjusted.

The tilting of the flat mirror 220 can be synchronized with the chopper 30. For example, when the external measurement-light path 37 (see FIG. 1) is selected by the chopper 30, the light P8, P9 having a low-light intensity passes through a lower portion of the density filter 204, and when the internal reference-light path 40 is selected, the light P8, P9 having a high-light intensity passes through an upper portion in relation to the above-mentioned lower portion on the density filter 204, in which the power of the light-transmitting light is large. Thereby, the power of the light at the light-receiving element 43 (see FIG. 1) can be adjusted.

Since the light-transmitting positions of the light P8, P9 move due to the tilting of the flat mirror 220, if the density gradient of the density filter 204 is configured to be large, a range of the light-power adjusting can be increased. With a combination of the condenser lens 202, the flat mirror 220, the density filter 204 and the rectangular prism 205, the light power can be adjusted without changing positions of the output end 361a of the optical fiber 361, the input end 362b of the optical fiber 362, a length of the light paths or the like.

As mentioned above, since the light-transmitting positions of the light P8, P9 are changed by tilting the flat mirror 220, even if a tilt angle of the flat mirror 220 is small, the light-transmitting positions can be greatly changed. Accordingly, high-speed switchings of the light-transmitting positions can be achieved.

Since the flat mirror 220 is disposed on a condensed position (a focus position) of the condenser lens 202, a size of the flat mirror 220 can be small. Therefore, the flat mirror 220 can be rapidly tilted, and the light power can be more rapidly switched. Since the flat mirror 220 is tilted by the MEMS 227, the flat mirror 220 can be more rapidly tilted so that the light power can be more rapidly switched.

In addition, although the variable optical attenuator 200 is disposed between the optical fibers 361 and 362, the variable optical attenuator 200 may be provided between the semiconductor laser 18 and the light-receiving element 43, for example, on a middle of the optical fiber 24 or 28.

Furthermore, although the condenser lens 202 is used in the above-mentioned example, it is possible to dispense with the condenser lens 202 in a case that the light output from the output end 361a of the optical fiber 361 is led to the flat mirror 220, is reflected on the flat mirror, is transmitted by the density filter 204, and is reflected on a corner cube to be led to the flat mirror.

The light input to the input end 362b of the optical fiber 362 is received by the light-receiving element 43 via lenses 41, 42.

The internal reference-light path 40 is used to avoid measurement errors by phase-changes due to, for example, a temperature-drift of an electrical circuit which is included in the ranging apparatus. A reference value obtained from the internal reference-light path 40 is removed from a measurement value obtained from the external measurement-light path 37 so that an accurate data can be obtained.

The control device 400 has a light-source controlling device, a measurement-light receiving device, a signal processing device, and a display device 51. The light-source controlling device includes an oscillator 11, a frequency divider 10 and a first switching unit 14. The oscillator 11 generates, for example, a signal of 15 MHz from the oscillator 11 and inputs it to the frequency divider 10. The frequency divider 10 divides the signal of 15 MHz into, for example, 75 kHz and 3 kHz. The signal of 75 kHz is input into the first switching unit 14.

The first switching unit 14 outputs either a signal of 15 MHz or 7 kHz based on a signal 16 from a processor, for example, a process control circuit 15 (mentioned below).

The measurement-light receiving device includes a synthesizer 13, a second switching unit 44, a frequency mixer 47 and a wave-shaping unit 48. The synthesizer 13 generates signals of 14.997 MHz and 72 kHz and inputs them to the second switching unit 44. The signal of 14.997 MHz is the difference between the signal of 15 MHz from the oscillator 11 and the signal of 3 kHz from the frequency divider 10, and the signal of 72 kHz is twenty-four-times the signal of 3 kHz from the frequency divider 10.

The second switching unit 44 outputs either the signal of 14.997 MHz or the signal of 72 kHz input from the synthesizer 13 based on the signal 16 from the process control circuit 15. An output signal from the light-receiving element 43 is amplified by an amplifier 46 and is input to the frequency mixer 47. The frequency mixer 47 mixes the signal from the amplifier 46 with the signal from the second switching unit 44 to form a beat signal. The frequency mixer 47 detects the beat signal and then outputs a sine wave of 3 kHz. The waveshaping unit 48 converts the sine wave of 3 kHz into a rectangular wave and outputs it as a beat down signal.

In order to allow the output from the frequency mixer 47 to be 3 kHz, the output signal of the first switching unit 14 and the output signal of the second switching unit 44 are controlled to be 15 MHz and 14.997 MHz, or 75 kHz and 72 kHz, respectively by the signal 16 from the process control circuit 15.

The semiconductor laser 18 is modulated with two types of signals having frequencies of 15 MHz and 75 kHz so that the signal of 15 MHz corresponding to a wavelength of 20 m is used for a fine measurement and the signal of 75 kHz corresponding to a wavelength of 4000 m is used for a rough measurement.

The signal of 3 kHz is formed from the signals of 15 MHz or 75 kHz by the frequency mixer 47 so that a high-resolution phase measurement can be achieved by the signal of 3 kHz converted from the signal of 15 MHz or 75 kHz.

The signal processing device includes a gate circuit 49, a counting unit 50 and the process control circuit 15. The gate circuit 49 outputs the signal of 15 MHz from the oscillator 11 to the counting unit (counting device) 50. The output of the gate circuit 49 starts when the signal of 3 kHz from the frequency divider 10 is input and stops when the signal from the wave-shaping unit 48 is input. The signal is counted by the counting unit 50 to measure a phase difference.

A counting value is the sum of N times measurements obtained by the counting unit 50. In order to determine the number N, the signal of 3 kHz from the frequency divider 10 is provided to the process control circuit 15. When the N times of measurements are finished, a reset signal 52 is provided from the process control circuit 15 to the counting unit 50 so that the counting unit is to be in a reset state. The counting value of the N times measurements is divided by N to obtain a mean value of the N times measurements. The distance to the subject is calculated from the mean value of the N times measurements and is displayed on the display device 51.

According to the above-mentioned embodiment, since the reflected light P3 is oscillated by the MEMS 27 with a high frequency wave, the inputting position to the input end 28a of the optical fiber 28 changes with time. Therefore when the reflected light P3 is transmitted by the optical fiber 28, the reflected light P3 is mixed, homogenized and output from the output end 28b of the optical fiber 28. Accordingly, the unevenness of the laser light output from the semiconductor laser 18 is eliminated when the laser light is output from the output end 28b of the optical fiber 28.

Although the frequency-modulated ranging apparatus as an embodiment of the variable optical attenuator according to the present invention has been illustrated, a pulse type ranging apparatus with a laser light may be used.

Since the MEMS 227 is used for the variable optical attenuator, a high-speed light-adjusting, low power consumption and lowering of noise can be achieved.

Embodiment 2

Figure 8:
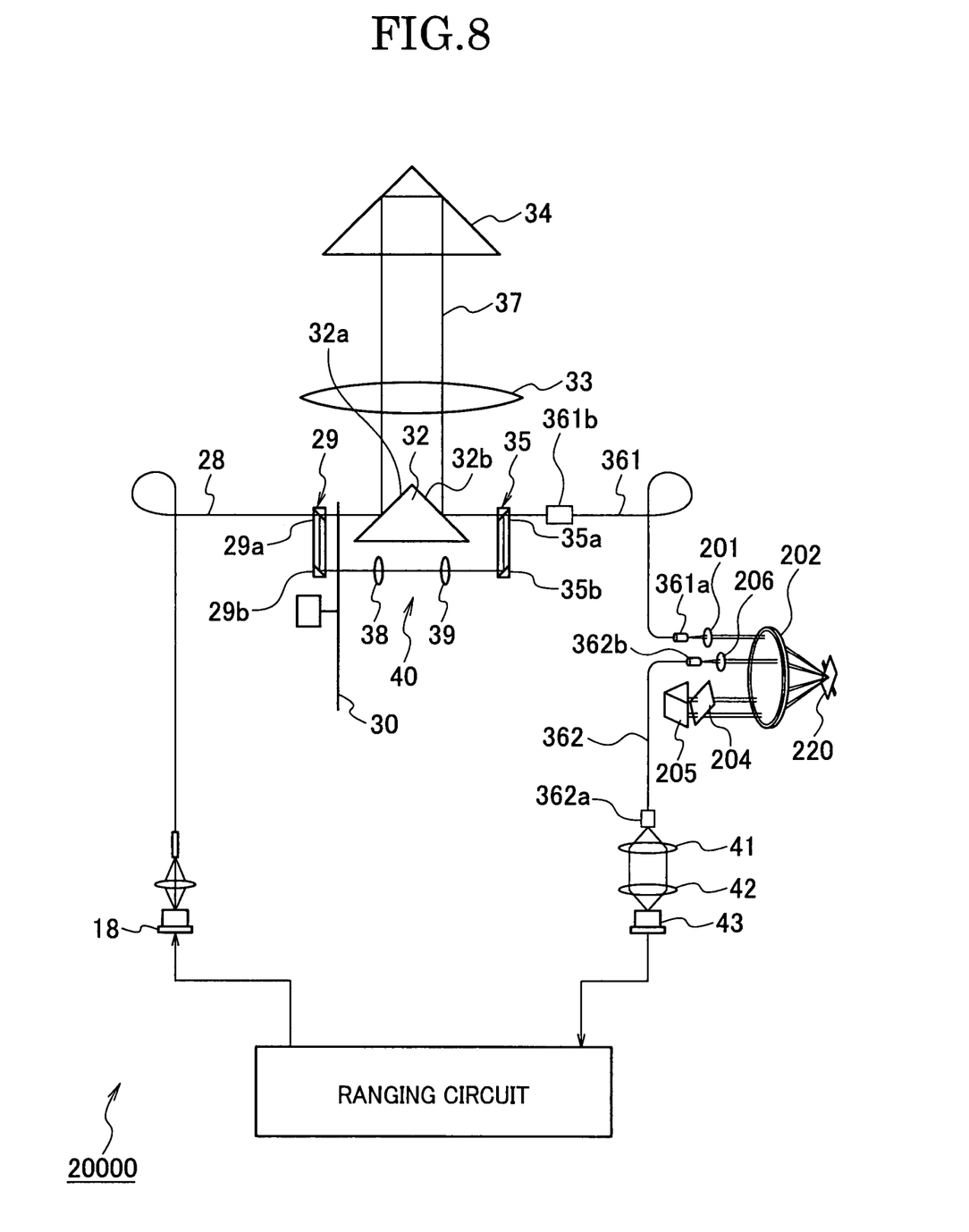
FIG. 8 is an explanatory view showing a structure of a second embodiment.

FIG. 8 shows a ranging apparatus 20000 of a second embodiment according to the present invention. The ranging apparatus 20000 is the same as that of the first embodiment except that the mixing device included in the ranging apparatus of the first embodiment is omitted.

According to the embodiment of the present invention, since the mirror is tilted to change the light-transmitting position of the laser light on the density filter, the high-speed switchings of the light power can be achieved.

What is claimed is:

1. A variable optical attenuator (200) for adjusting a power of light which is output from an output end of a first optical fiber (361) and is to be led to an input end of a second optical fiber (362), comprising:
    a reflection member (220) which reflects the light output from the output end of the first optical fiber;
    a density filter (204) which transmits the light reflected from the reflection member and controls the power of the light which is transmitted by the density filter depending on a light-transmitting position on the density filter; and
    an optical member (205) which reflects the light transmitted by the density filter to lead the light to the input end of the second optical fiber via the reflection member, wherein
    the reflection member is disposed tiltably so that the light-transmitting position of the light on the density filter is changed by adjusting the tilt of the reflection member.

2. The variable optical attenuator according to claim 1, further comprising a condenser lens (202) to candense the light from the output end of the first optical fiber on the reflection member.

3. The variable optical attenuator according to claim 1, wherein the reflection member is tilted by a micro electro mechanical system (227) having at least one movable portion on a chip or a substrate (227h).

4. The variable optical attenuator according to claim 1, wherein the optical member has two reflecting surfaces which are disposed perpendicularly to each other and which allow the light transmitted by the density filter to be moved in parallel and reflected to the reflection member.

5. The variable optical arrenuator according to claim 1, further comprising: a condenser lens (202) to condense the light from the output end of the first optical fiber on the reflection member; and
    an optical member (205) which reflects the light transmitted by the density filter to lead the light to the condenser lens.

6. The variable optical attenuator according to claim 1, wherein the light reflected on the optical member passes through the density filter.

7. A variable optical attenuator (200) for adjusting a power of light which is disposed in a light path between an output end of the first optical fiber (361) and an input end of a second optical fiber (362) and has a density filter (204) controlling the power of the light depending on a light-transmitting position on the density filter, comprising:
    a first optical device to reflect the light output from the output end of the first optical fiber so that the light is transmitted by the density filter; and
    a second optical device to lead the light transmitted by the density filter to the input end of the second optical fiber, wherein
    the first optical device has a reflection member which is disposed tiltably so that the light-transmitting position of the light on the density filter is changed by adjusting the tilt of the reflection member.

8. The variable optical attenuator according to claim 7, wherein
    the first optical device has a condenser lens (202) to condense the light from the output end of the first optical fiber on the reflection member;
    the reflection member reflects the light condensed by the condenser lens to the density filter via the condenser lens;
    the second optical device has two reflecting surfaces which are disposed perpendicularly to each other and which allow the light transmitted by the density filter to be moved in parallel and reflected to the condenser lens;

the condenser lens condenses the light reflected on the optical member onto the reflection member; and the reflection member inputs the light condensed by the condenser lens to the input end of the second optical fiber via the condenser lens.

9. The variable optical attenuator according to claim 8, wherein the light reflected on the optical member passes through the density filter.

10. The variable optical attenuator according to claim 7, wherein the power of the light transmitted by the density filter attenuates according to a direction in which the light-transmitting position is changed.

11. A ranging apparatus (100) for measuring a distance by irradiating light to a subject and receiving the light reflected on the subject, comprising first and second optical fibers (361, 362), each of the first and second optical fibers having an input end to input the light and an output end to output the light; and a variable optical attenuator (200) which is disposed in a light path formed between the output end of the first optical fiber and the input end of the second optical fiber and adjusts a power of the light; wherein the variable optical attenuator has a reflection member (220) which reflects the light output from the output end of the first optical fiber, and a density filter (204) which transmits the light reflected from the reflection member and controls the power of the light which is transmitted by the density filter depending on a light-transmitting position on the density filter;

the reflection member is disposed tiltably so that the light-transmitting position of the light on the density filter is changed by adjusting the tilt of the reflection member; and the reflection member reflects the light transmitted by the density filter toward the input end of the second fiber.

12. The ranging apparatus according to claim 11, wherein the power of the transmitted light attenuates according to a direction in which the light-transmitting position is changed.

13. The ranging apparatus according to claim 11, further comprising a split portion configured to split light into a reference light path (40) and a measurement light path (40) and a light-selecting device (30) which selects either the reference light path or the measurement light path, wherein the reflection member tilts in synchronization with the light-selecting device.

* * * * *